(12) United States Patent
Ballough et al.

(10) Patent No.: US 9,808,883 B2
(45) Date of Patent: Nov. 7, 2017

(54) DUAL ULTRASONIC WELDER

(71) Applicant: TA Systems, Inc., Rochester Hills, MI (US)

(72) Inventors: Matthew E. Ballough, Clarkston, MI (US); Thomas J. Martin, Romeo, MI (US); Kirk A. Brunssen, Orchard Lake, MI (US); Timothy S. Gale, Rochester Hills, MI (US); Timothy E. Dunbar, Rochester Hills, MI (US); Lawrence F. Garrison, II, Grand Blanc, MI (US); Gary J. Olson, Auburn Hills, MI (US)

(73) Assignee: T.A. Systems, Inc., Rochester Hills, MI (US)

( * ) Notice: Subject to any disclaimer, the term of this patent is extended or adjusted under 35 U.S.C. 154(b) by 87 days.

(21) Appl. No.: 14/961,847

(22) Filed: Dec. 7, 2015

(65) Prior Publication Data

US 2016/0158877 A1 Jun. 9, 2016

Related U.S. Application Data

(60) Provisional application No. 62/088,468, filed on Dec. 5, 2014.

(51) Int. Cl.
*B23K 20/10* (2006.01)
*B29C 65/08* (2006.01)
(Continued)

(52) U.S. Cl.
CPC .............. *B23K 20/10* (2013.01); *B29C 65/08* (2013.01); *B29C 66/21* (2013.01); *B29C 66/301* (2013.01);
(Continued)

(58) Field of Classification Search
None
See application file for complete search history.

(56) References Cited

U.S. PATENT DOCUMENTS

| 4,549,684 A | * | 10/1985 | Telly | ...................... B23K 20/10 |
| | | | | 156/73.1 |
| 6,112,973 A | * | 9/2000 | Hortaleza | ............ B23K 20/004 |
| | | | | 156/73.2 |

(Continued)

FOREIGN PATENT DOCUMENTS

| CN | 202180294 U | * | 4/2012 |
| CN | 102744881 A | * | 10/2012 |

(Continued)

*Primary Examiner* — Devang R Patel
(74) *Attorney, Agent, or Firm* — Carlson, Gaskey & Olds, P.C.

(57) ABSTRACT

A dual ultrasonic welder unit may be coupled to and carried by a mounting bracket including a base member extending in a an end of a robot arm and may include a first welder including a welding horn adjustable in a Z-axis direction by a first motor mounted within a mounting bar assembly of the first welder. The mounting bar assembly may be coupled to the base member and include a support for adjusting the location of the first welder in an X-axis direction by a second motor mounted to an extension member coupled to the base member and including a threaded member coupled to a follower member coupled to the mounting bar assembly. The dual ultrasonic welder may include a second ultrasonic welder fixedly coupled to the base member. Methods of controlling and operating the dual ultrasonic welding unit include steps of operating the robot and the first and second motors to position the first welder relative to the second welder unit for simultaneously performing ultrasonic welds on at multiple locations on a workpiece.

6 Claims, 10 Drawing Sheets

(51) Int. Cl.
*B29C 65/00* (2006.01)
*B29C 65/60* (2006.01)

(52) U.S. Cl.
CPC .......... *B29C 66/54* (2013.01); *B29C 66/8169* (2013.01); *B29C 66/81451* (2013.01); *B29C 66/81463* (2013.01); *B29C 66/8322* (2013.01); *B29C 66/8432* (2013.01); *B29C 66/863* (2013.01); *B29C 65/606* (2013.01); *B29C 66/8246* (2013.01)

(56) References Cited

U.S. PATENT DOCUMENTS

| | | | |
|---|---|---|---|
| 7,438,210 B2 | 10/2008 | Gale et al. | |
| 8,413,874 B2 * | 4/2013 | Yan | B23K 20/10 |
| | | | 156/580.2 |
| 2008/0023529 A1 * | 1/2008 | Reatherford | B23K 20/10 |
| | | | 228/110.1 |

FOREIGN PATENT DOCUMENTS

| | | | |
|---|---|---|---|
| CN | 202591829 U | * | 12/2012 |
| CN | 103537790 A | * | 1/2014 |
| CN | 203622944 U | * | 6/2014 |
| CN | 204843248 U | * | 12/2015 |

* cited by examiner

DUAL ULTRASONIC WELDER

CROSS-REFERENCE TO RELATED APPLICATIONS

This application claims priority to and the benefit of U.S. Provisional Patent Application No. 62/088,468, filed Dec. 5, 2014, in the name of GALE et al. and entitled Dual Ultrasonic Welder, the entire contents of which are incorporated herein for all purposes.

FIELD

The present disclosure generally relates to a welder for coupling multiple parts. More particularly, the present disclosure relates to an ultrasonic welder unit for coupling to an end effector arm of a robot.

BACKGROUND

Ultrasonic welding may be used to join plastic parts together by rapidly transmitting ultrasonic energy through a shaped tool known as an ultrasonic horn. The energy is in the form of mechanical vibrations creates friction between the parts to generate sufficient heat to melt and fuse together (i.e., weld) the plastic parts. An ultrasonic welder includes an ultrasonic transducer (i.e., an ultrasonic converter). The transducer is housed within a bottom portion of a housing of the welder. The horn is mounted to the bottom end of the transducer and is located adjacent to the bottom housing portion. The transducer may be a piezoelectric element that mechanically vibrates upon being energized, typically by having an electric current applied. The vibration frequency typically falls within a range of 10-50 kHz. As the transducer vibrates at a given frequency, the horn incrementally moves up and down at the same frequency (for instance, on the order of ±0.0004 inches per cycle).

To sonically weld two parts together, the two parts may be co-located and/or Stacked—typically by placing one part on top of another part in a fixture. The horn may then brought into forced contact with the top part while the bottom part is supported by the stationary surfaces of the holding fixture. As the transducer vibrates upon being supplied with electricity, the horn vibrates by reciprocating vertically such that the horn resonates toward and away from the top part. The horn reciprocation in relation to the parts (i.e., the transfer of vibratory energy from the horn to the parts) creates the heat which fuses the parts together.

An ultrasonic welder typically includes either a motor drive assembly for positioning the horn relative to the parts (i.e., for moving the horn towards the parts to bring the horn into forced contact with the parts and for moving the horn away from the parts such that the horn is not in contact with the parts). A typical motor drive assembly may include a motor having a ball screw rotatable drive shaft connected to the exterior surface of the top face of the transducer housing. The motor is driven when powered to rotate the ball screw drive shaft one way causing the transducer housing and the horn to move away from the motor housing and toward the parts to be welded until the horn contacts the top of the part. After the parts are welded together, the motor is driven in response to another electrical signal to rotate the ball screw drive shaft in the opposite direction causing the transducer housing and the horn to move back toward the motor housing and away from the parts after the welding is completed.

In addition to not using compressed air, advantages associated with a typical ball screw motor drive assembly include precise horn positioning as a result of electronically controlling the motor. Electronic motor control also provides indirect information regarding the positioning of the horn (for example, by monitoring the revolutions of the ball screw drive shaft). A position transducer which directly monitors movement of the horn may be employed to provide information regarding the horn positioning. However, a problem with an ultrasonic welder having a typical motor drive assembly is that drive components of the motor drive assembly are not integral with the transducer housing. For instance, the drive shaft is connected to the exterior surface of the top face of the transducer housing. Consequently, the overall size including the height of the ultrasonic welder is relatively large. Another problem with an ultrasonic welder having a typical motor drive assembly is that the drive components do not linearly guide the horn while positioning the horn. For instance, the drive shaft and guide shafts may be connected to the exterior surface of the top transducer housing face resulting in unintentional linear movement of the horn relative to the top transducer housing end (i.e., "wobbling") which may occur when the horn is in forced contact with the parts to be welded. One example of an ultrasonic welder is disclosed in U.S. Pat. No. 7,438,210, issued Oct. 21, 2008, the disclosure of which is incorporated herein for all purposes.

One known ultrasonic welder is disclosed by Franz Vokurka in his U.S. Pat. No. 4,323,758, issued Apr. 6, 1982, which relates to a known automatic welding machine they may be equipped with only one welding gun. More particularly, Vokurka discloses an automatic welding machine for an arc welder or resistance welder wherein a beam, by means of a carrier, is movably supported by a column, whereby the carrier, both in the direction of its longitudinal extent (Axis B) as well as in a direction (Axis A) perpendicular thereto and parallel to the longitudinal extent of the column, is displaceably guided on the column so that the beam may be displaceable both is a direction perpendicularly (Axis B) to its longitudinal extent (Axis C), as well as in a direction (Axis A) perpendicular to its longitudinal extent and perpendicular to the longitudinal extension of the carrier (Axis B). Further, the beam may include at least two displaceably guided multi-articulated holders for welding guns or pincher guns, and drives may be provided for displacing the holders on the beams and for swinging the articulations on the holders whereby the drives which are coordinated under the circumstances from time to time to the holders or respectively to the welding guns or the pincher guns for making welding seams (which seams run parallel or symmetrical to each other) and may be selectively coupled with each other mechanically or electronically. Vokurka discloses the use of two arc or resistance welding guns mounted in multi-articulated holders on a beam attached to a carrier of an arc or resistance welder that may weld simultaneously but in limited areas where the welding seam runs parallel or symmetrical to each other.

SUMMARY

The present disclosure provides for a dual ultrasonic welder assembly having multiple (i.e., two), simultaneously operational, ultrasonic welding units for providing a reduced cycle part time. At least one of the simultaneously operational, ultrasonic welding units may be provided with a motor drive assembly for controlling the movement and positioning of an ultrasonic horn in a direction toward and away from the objects to be welded. One example of a single ultrasonic welding unit is described in U.S. Pat. No. 7,438, 210, the entire contents of which are incorporated herein by reference for all purposes.

The present disclosure relates to an ultrasonic welder having multiple operational ultrasonic welding units wherein at least one of the welding units is provided with a motor drive assembly integrated with an ultrasonic transducer housing such that an ultrasonic horn mounted to the ultrasonic transducer housing to be linearly guided as the ultrasonic horn is brought into forced contact with the parts to be welded. In one particular, aspect, the multiple operational ultrasonic welding units are simultaneously brought into forced contact with the parts to be welded.

The present disclosure relates to an ultrasonic welder having multiple operational ultrasonic welding units for coupling to and movement by a single robot arm wherein at least one of the welding units is provided with a motor drive assembly integrated with an ultrasonic transducer housing such that an ultrasonic horn mounted to the ultrasonic transducer housing to be linearly guided as the ultrasonic horn is brought into forced contact with the parts to be welded. In one particular, aspect, the multiple operational ultrasonic welding units are sequentially brought into forced contact with the parts to be welded without The present disclosure relates to an ultrasonic welder having multiple (at least two) ultrasonic welding units. At least one of the welding units is provided with a motor drive assembly integrated with an ultrasonic transducer housing for electronically controlling the pressure applied by an ultrasonic horn mounted to the ultrasonic transducer housing onto parts to be welded.

The present disclosure relates to a robot having an arm for supporting and operating multiple ultrasonic welding units, wherein at least one of the welding units is attached to an end effector arm of the robot and is fixed with respect thereto in a Z axis direction and the at least one of the welding units may be independently controlled in the X-Y axis with respect to the end effector arm of the robot.

The present disclosure provides for a robotic welder assembly including an ultrasonic welder including a housing, a vibration unit, a horn, a motor having a ball screw drive shaft, and a mounting assembly for coupling to a plate of the end effector arm. The housing may have a fastener receiver which extends from within the housing out through the top end of the housing. The robotic welder assembly may further include an ultrasonic transducer mounted within the housing and located proximal the bottom end of the housing. The ultrasonic horn may be mounted to the bottom end of the housing such that the horn vibrates from the output of the vibration unit. The housing may further include a pair of shaft openings extending from within the housing out through the top end of the housing.

The mounting assembly may include a body and a fastener(s) for coupling the body. The top end of the fastener is connected within the mounting assembly body to the motor shaft such that the fastener rotates as the motor shaft is being driven. The bottom end of the fastener may extend out of the mounting assembly body through the top end of the housing into a portion of the fastener receiver. The fastener pulls the housing with respect to the horn vertically (in a direction aligned with a z-axis) upward toward the mounting assembly body upon rotation of the fastener in a first direction causing the fastener to extend into a larger portion of the fastener receiver. The fastener pushes the housing with the horn vertically downward away from the mounting assembly body upon rotation of the fastener in a second direction opposite the first direction causing the fastener to extend into a smaller portion of the fastener receiver.

The mounting assembly may further include a pair of guide shafts. The top guide shaft ends are fixed in place within the mounting assembly body and the bottom guide shaft ends extend out of the mounting assembly body through the top end of the housing into portions of the respective shaft openings to thereby provide linear rigidity to the horn as the horn is brought into forced contact with parts to be welded. The bottom guide shaft ends extend into larger (smaller) portions of the respective shaft openings as the housing with the horn move vertically upward (downward) towards (away from) the mounting assembly body.

The welder may further include a linear transducer operable for generating a position signal indicative of a location along its length that is being pinched. The housing may further include a sensor receiver opening extending from within the housing out through the top end of the housing. The top end of the linear transducer is fixed in place within the mounting assembly body and the bottom end of the linear transducer extends out of the mounting assembly body through the top end of the housing into the sensor receiver opening. The sensor receiver opening includes a pinching insert which pinches the linear transducer at a given location along the length of the linear transducer whereby the position signal generated by the linear transducer is indicative of the vertical location of the horn relative to the mounting body assembly. The bottom linear transducer end extends into a larger (smaller) portion of the sensor receiver opening as the housing with the horn move vertically upward (downward) towards (away from) the mounting assembly body.

The fastener receiver is a threaded ball screw receiver and the fastener is a threaded ball screw. The housing may further include a nut which is mounted to the top end of the housing, extends within a portion of the housing, and is secured around the threaded screw receiver. The housing may further include a set screw positioned adjacent to the threaded screw receiver to set a maximum limit of the extension of the screw into the threaded screw receiver.

In operation, the motor shaft is driven upon the motor receiving an electrical signal from a processor such as a programmable logic converter (PLC) or a personal computer (PC). The linear transducer provides the position signal to the processor for the processor to monitor the position of the horn in order to provide proper electrical signals to the motor to effect a desirous welding result.

The present disclosure further provides for an ultrasonic welder having a housing, an ultrasonic transducer mounted within the housing adjacent to the bottom end of the housing, an ultrasonic horn mounted to the bottom end of the housing such that the horn vibrates as the transducer is supplied with power, a motor, and a threaded screw rotatable in first and second opposite directions. The housing includes a threaded screw receiver extending longitudinally within a portion of the housing above the bottom end of the housing and out through the top end of the housing. The top end of the screw is connected to the motor shaft such that the screw rotates as the motor shaft is being driven. The bottom end of the screw longitudinally extends through the top end of the housing into the threaded screw receiver. The screw extends further into the threaded screw receiver by engaging more threads of the threaded screw receiver as the screw rotates in the first direction such that the housing with the horn move vertically upward. The screw extends further out of the threaded screw receiver by engaging less threads of the threaded screw receiver as the screw rotates in the second direction such that the housing with the horn move vertically downward.

The housing may further include a pair of shaft openings extending longitudinally within respective portions of the housing above the bottom end of the housing and out through the top end of the housing. In this case, the welder further includes a pair of guide shafts with the top guide shaft ends being fixed in place to a housing of the motor and the bottom guide shaft ends longitudinally extending through the top end of the housing into portions of the respective shaft openings to thereby provide linear rigidity to the horn as the horn is brought into forced contact with parts to be welded.

The welder may further include a linear transducer operable for generating a position signal indicative of a location along its length that is being pinched. In this case, the housing further includes a sensor receiver opening longitudinally extending within a portion of the housing above the bottom end of the housing and out through the top end of the housing. The top end of the linear transducer is fixed in place to the motor housing and the bottom end of the linear transducer longitudinally extends through the top end of the housing into the sensor receiver opening. The sensor receiver opening includes a pinching insert which pinches the linear transducer at a given location along the length of the linear transducer whereby the position signal generated by the linear transducer is indicative of the vertical location of the horn relative to the given location.

The welder further includes first and second welding units attached directly to the robot's end effector arm. The second welding unit is similar to the first welding unit which is as described above, but may have no motor assembly, fastener receiver or fastener, all elements to move the welding unit in the Z direction (along its longitudinal axis). The second welding unit may be coupled or fixed to the end effector arm of the robot so that movement of the second welding unit is limited to the X and Y direction movement of the end effector arm of the robot. The second ultrasonic transducer housing, ultrasonic transducer, and ultrasonic horn of the second welding unit are similar to that of the first welding unit and operationally the second welding unit differs in that it has fewer degrees of freedom in that it may only move in two (e.g., X and Y) planes since the second welding unit is fixed to the robot's end effector arm.

The above objects, other objects, and advantages of the present disclosure are readily apparent from the following detailed description in connection with the drawings.

DETAILED DESCRIPTION

Figure 1:
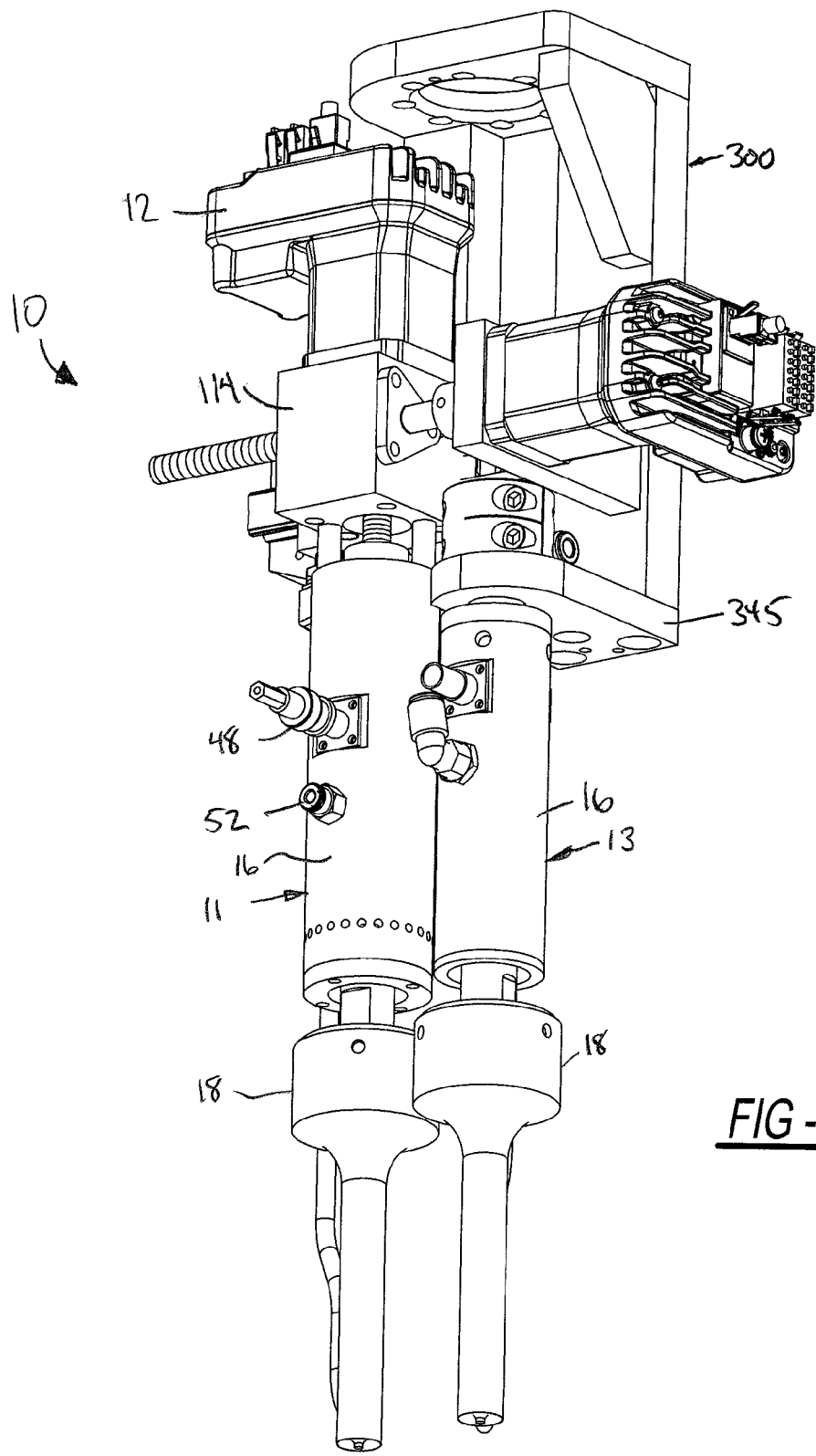
FIG. 1 illustrates a perspective view of a dual ultrasonic welder in accordance with the present disclosure.

Referring generally to the figures and in particular to FIG. 1, there is shown a perspective view of a dual ultrasonic welder unit 10 to be coupled to a robot for simultaneously performing multiple ultrasonic welds on workpieces to be joined together in accordance with an embodiment of the present disclosure. The dual head ultrasonic welder unit 10 may include two ultrasonic welders 11 and 13 for simultaneously, ultrasonically welding a workpiece (or workpieces to be coupled together) at two different positions for use in assembly systems for parts or workpieces that require many welds. The dual head ultrasonic welder unit 10 may provide for a significantly decreased cycle time for producing the parts in the assembly system while eliminating the need for an additional and expensive robot. The dual ultrasonic welder unit 10 has particular benefits due to its compact and unique design.

At least one of the first and second ultrasonic welders 11 and 13 may be substantially similar to the servo ultrasonic welding unit as disclosed and described in U.S. Pat. No. 7,438,210, the contents of which are incorporated herein by reference for all purposes. In particular, the first ultrasonic welder 11 of the dual ultrasonic welder unit 10 may be substantially similar to the servo sonic welding unit as disclosed and described in U.S. Pat. No. 7,438,210 as best shown in detail in FIG. 2 and FIG. 3 which will now be generally repeated for the details of construction and operation of the ultrasonic welder portions of the dual servo ultrasonic welder 10. The robot 400, the mounting bracket 300 and the welder unit adjuster 410 of the welder unit 10 of the present disclosure are described in great detail below.

Figures 2, 3:
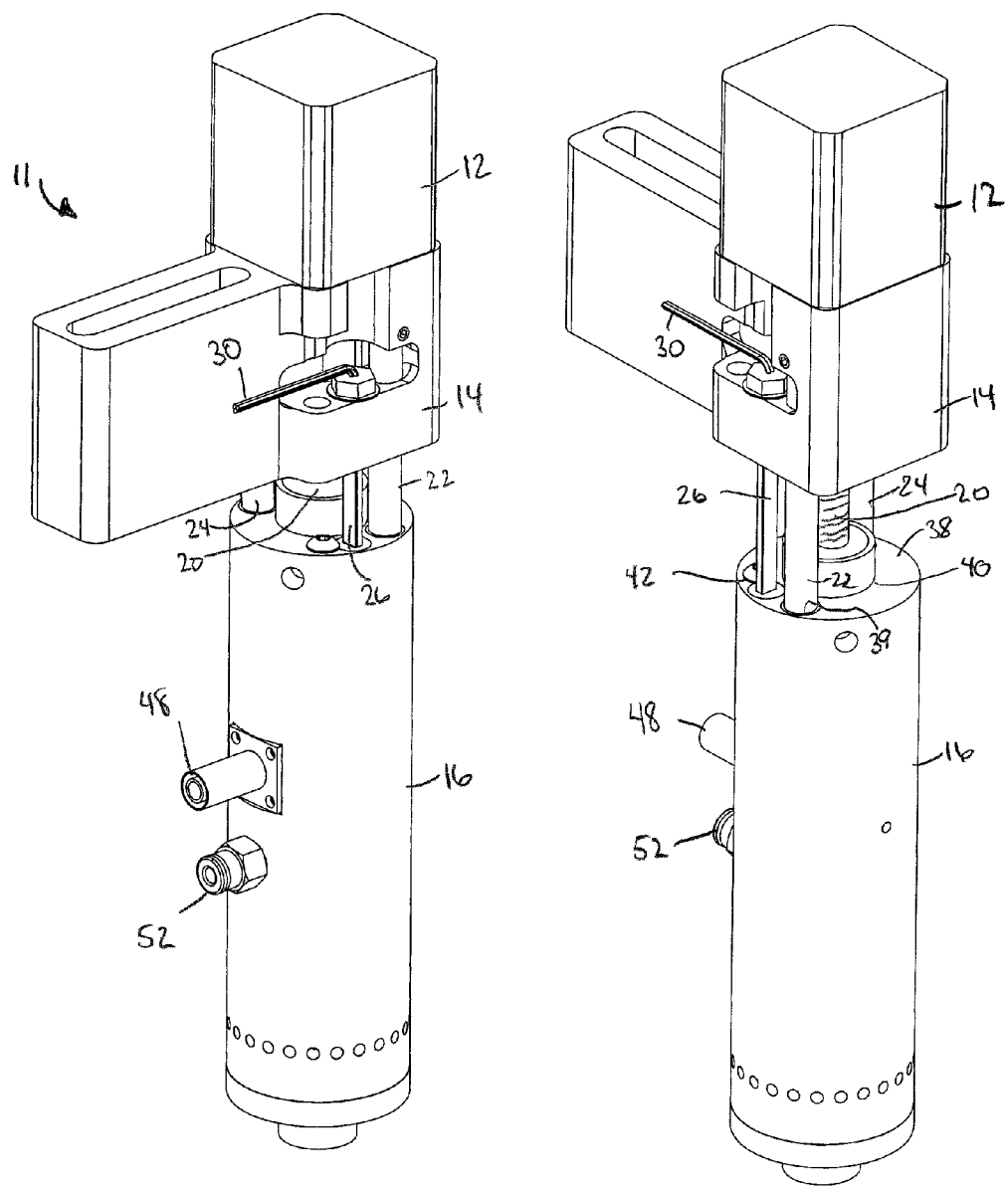
FIG. 2 illustrates a perspective view of a known ultrasonic welder.
FIG. 3 illustrates an alternate perspective view of the prior art ultrasonic welder of FIG. 2 rotated by about 90 degrees and in an extended or engaged position.

The first ultrasonic welder 11 of the dual ultrasonic welder unit 10 may include a motor assembly 12 for moving the first ultrasonic welder 11 between a retracted or disengaged (non-welding) position (see FIG. 2) and an extended or engaged (welding) position (see FIG. 3 which view is rotated 90 degrees as compared to the view in FIG. 2). The first ultrasonic welder 11 of the welder unit 10 may include a mounting bar assembly 14. Motor 12, mounting bar assembly 14, and transducer housing 16 are connected to one another such that the transducer housing is vertically movable relative to the bodies of the motor and the mounting bar assembly. Mounting bar assembly 14 is connected at a top end of its body to motor 12 and a bottom portion of the mounting bar assembly is integrally connected within transducer housing 16 such that the mounting bar assembly connects the motor and the transducer housing to one another. Mounting bar assembly 14 transfers rotary energy of motor 12 to the bottom mounting bar assembly portion in order to vertically move transducer housing 16 relative to the mounting bar assembly body. As shown in FIG. 2, transducer housing 16 is vertically moved upward to be positioned adjacent to the body of mounting bar assembly 14. As a result, welder 10 is in the retracted position. Conversely, as shown in FIG. 3, transducer housing 16 is moved vertically downward to be positioned away from the body of mounting bar assembly 14. As a result, welder 10 is in the engaged position.

An ultrasonic horn 18 is mounted to the bottom end of transducer housing 16. As transducer housing 16 vertically moves relative to the body of mounting bar assembly 14, horn 18 moves with the transducer housing and, consequently, also vertically moves relative to the mounting bar assembly body. In the retracted position of welder 10, horn 18 is intended to be vertically moved upward and away from parts to be welded by the welder. Accordingly, horn 18 is not in contact with the parts and is disengaged from the parts when welder 10 is in the retracted position. In the engaged position of welder 10, horn 18 is intended to be vertically moved downward and toward the parts until the horn is brought into forced contact with the parts. Accordingly, horn 18 is in contact and engaged with the parts when welder 10 is in the engaged position.

The motor 12 may preferably be a servo, stepper motor having a drive shaft rotatable in clockwise and counter-clockwise directions. More particularly, motor 12 may be an integrated micro-stepping drive having a relatively high torque, 2-phase stepper motor. One example of such a motor is the Lexium MDrive® brand motor available from Schneider Electric of Marlboro, Conn. and shown on their website at http://motion.schneider-electric.com/lmd/. Upon receiving a command electrical signal, motor 12 rotates the screw drive shaft in the clockwise direction. Upon receiving another command electrical signal, motor 12 rotates the drive shaft in the counter-clockwise direction. Motor 12 rotates the drive shaft at varying speeds depending upon the electrical signals. A processor such as a programmable logic controller (PLC) provides the electrical signals to motor 12 and communicates with the stepper motor 12 to maintain the precise position of the drive shaft and the transducer housing 16 and horn 18. Accordingly, the motor 12 may include any known or appropriate control and position devices for constantly determining the position of an element (such as horn 18) while it is being moved in response to rotation of the drive shaft.

As indicated above, mounting bar assembly 14 is connected at the top end of its body to motor 12. Mounting bar assembly 14 includes a threaded screw 20 which is rotatable in clockwise and counter-clockwise directions. Screw 20 extends out from the bottom end of the mounting bar assembly body. Mounting bar assembly 14 includes a coupler within the mounting bar assembly body. The coupler connects the top end of screw 20 to the drive shaft of motor 12 and couples rotary motion of the drive shaft to the screw causing the ball screw to rotate in the same direction and speed at which the drive shaft rotates. The body of screw 20 is integrally connected to a threaded screw receiver within transducer housing 16 such that rotation of the screw relative to the threaded screw receiver causes the transducer housing and horn 18 to vertically move upward and downward. In particular, rotation of screw 20 in one of the clockwise and counter-clockwise directions causes the screw to effectively pull transducer housing 16 with horn 18 vertically upward and toward the body of mounting bar assembly 14. In this case, screw 20 extends into more of the threaded screw receiver as transducer housing 16 vertically moves upward. Likewise, rotation of screw 20 in the other direction, in conjunction with the downward weight of transducer housing 16, causes the screw to effectively push the transducer housing with horn 18 vertically downward and away from the body of mounting bar assembly 14. In this case, screw 20 extends into less of the threaded screw receiver as transducer housing 16 vertically moves downward.

Mounting bar assembly 14 further includes a pair of linear guide shafts 22 and 24. The top ends of guide shafts 22 and 24 are fixedly mounted within the body of mounting bar assembly 14. Guide shafts 22 and 24 extend out from the bottom end of the mounting bar assembly body and into transducer housing 16. Guide shafts 22 and 24 are respectively received within shaft housings located inside transducer housing 16. Because guide shafts 22 and 24 are fixedly mounted to the body of mounting bar assembly 14, the shaft housings move relative to guide shafts 22 and 24 such that the shaft housings encompass varying portions of the guide shafts as transducer housing 16 vertically moves. Particularly, the shaft housings encompass more of the length of guide shafts 22 and 24 as transducer housing 16 vertically moves upward and encompass less of the length of the guide shafts as the transducer housing vertically moves downward.

Mounting bar assembly 14 further includes a linear transducer (i.e., a displacement sensor) 26. A top end of linear transducer 26 is fixedly mounted within the body of mounting bar assembly 14. Linear transducer 26 extends out from the bottom end of mounting bar assembly 14 and into a sensor receiver housing within transducer housing 16. Because linear transducer 26 is fixedly mounted within the body of mounting bar assembly 14, transducer housing 16 and the sensor receiver housing move relative to the linear transducer as the transducer housing vertically moves up and down. Linear transducer 26 generates a position signal indicative of its linear position relative to transducer housing 16 at a given time. As such, linear transducer 26 monitors the position of horn 18 as transducer housing 16 vertically moves. Further, position signals generated by linear transducer 26 at different times are indicative of the speed at which horn 18 moves as transducer housing 16 vertically moves.

Transducer housing 16 is a tubular structure having a barrel or can-like shape. The bottom portion of transducer housing 16 houses an ultrasonic transducer (i.e., an ultrasonic converter). The transducer may be a piezoelectric element that mechanically vibrates upon receiving electricity. As the horn 18 is mounted to the bottom end of transducer housing 16, the horn 18 incrementally moves up and down at the frequency at which the transducer vibrates. Reciprocation of horn 18 in relation to parts to be welded together creates heat which welds the parts together when the horn is in forced contact with the workpiece or parts W.

Referring now to FIGS. 2 and 3, with continual reference to FIG. 1, side and frontal views of motor 12 and mounting bar assembly 14 of welder 10 are respectively shown. Motor 12 includes a communications line which connects the motor to a processor such as a PLC. Motor 12 receives electrical control and power signals from the PLC via communications line. In turn, motor 12 drives its drive shaft in response to receipt of such signals. Linear transducer 26 includes a communications line 30 which connects the linear transducer to a processor such as the PLC. Linear transducer 26 communicates the position signals that it generates while monitoring the vertical position of transducer housing 16 (and consequently the vertical position of horn 18) to the processor via communications line 30. In turn, the processor processes the position signals to determine the position of horn 18 as well as the rate of speed at which the horn is vertically moved. The processor may use such information to provide the proper control and power signals to motor 12 in order to achieve a desirous effect with respect to the movement and positioning of horn 18 during welding operations.

A top portion of linear transducer 26 extends within the body of mounting bar assembly 14 and may connect with a communications line 30. The top portion of linear transducer 26 is fixedly mounted within the body of mounting bar assembly 14 such that the linear transducer remains stationary in place relative to the mounting bar assembly at all times. A bottom portion of linear transducer 26 extends out from the body of mounting bar assembly 14. The bottom portion of linear transducer 26 extends into transducer housing 16. Top portions of guide shafts 22 and 24 extend within the body of mounting bar assembly 14. The top portions of guide shafts 22 and 24 are fixedly mounted within the body of mounting bar assembly 14 such that the guide shafts remain stationary in place relative to the mounting bar assembly at all times. Bottom portions of guide shafts 22 and 24 extend into transducer housing 16.

The lengths and mounting positions of guide shafts 22 and 24 may extend within the shaft housings of the transducer housing 16 to effectively linearly guide the horn 18 as the horn 18 is brought into forced contact with workpiece W to be sonically welded. Preferably, the linear transducer 26 may have a slightly longer length extending out from the body of mounting bar assembly 14 than the length of the bottom portions of guide shafts 22 and 24 which may have the same length. In this way, the linear transducer 26 is able to monitor the position of transducer housing 16 and horn 18 in a position range greater than the bottom portion length of the guide shafts. Preferably, the bottom portion length of guide shafts 22 and 24 is greater than the length of screw 20 extending out from the body of mounting bar assembly 14. As explained in further detail below, the length of screw 20 is a factor which defines the vertical movement range of transducer housing 16 and horn 18. As such, because the bottom portion length of guide shafts 22 and 24 is greater than the length of screw 20, the guide shafts are able to provide a relatively greater amount of linear guiding to horn 18 as the horn is brought into forced contact with parts to be welded.

With continual reference to FIGS. 2 and 3, as indicated above, the retracted position is for moving horn 18 away from contact with parts (which may have just been welded together by the welder 10). As such, in the retracted position, the top body portion of the transducer housing 16 is positioned adjacent to the bottom body portion of mounting bar assembly 14. Screw 20 extends as far as it may within threaded screw receiver of transducer housing 16, guide shafts 22 and 24 extend all the way through shaft housings (not shown) of the transducer housing. In operation, screw 20 is rotated upon being driven by motor 12 to engage less threads of the threaded screw receiver mounted within the transducer housing 16 in order to move up out of the threaded screw receiver. This effectively vertically pushes transducer housing 16 away mounting bar assembly 14. As transducer housing 16 vertically moves down and away from mounting bar assembly 14, guide shafts 22 and 24 and linear transducer 26 move further and further out of their respective shaft housings and sensor receiver housing of the transducer housing within the transducer housing.

As indicated above, the engaged position is for moving horn 18 into forced contact with parts (which are to be welded together by welder 10). As such, in the engaged position, the top body portion of transducer housing 16 is positioned away from the bottom body portion of mounting bar assembly 14. Screw 20 partially extends into threaded screw receiver of the transducer housing 16, guide shafts 22 and 24 partially extend through shaft housings of the transducer housing, and linear transducer 26 partially extends through sensor receiver housing of the transducer housing. In operation, screw 20 is rotated upon being driven by motor 12 to engage less threads of threaded screw receiver to move upward from the threaded screw receiver. This effectively vertically pushes transducer housing 16 away from the mounting bar assembly 14. As transducer housing 16 vertically moves down and away from mounting bar assembly 14, guide shafts 22 and 24 and linear transducer 26 move further and further out of their respective shaft housings and sensor receiver housing of the transducer housing.

As motor 12 effectively controls the vertical movement of transducer housing 16, the movement and positioning of horn 18 is electronically controlled. As such, precise positioning of horn 18 relative to parts W as well as precise movement (i.e., speed, acceleration, etc.) of the horn relative to the parts W is enabled as the motor 12 may be precisely controlled by a processor such as a PLC. Further, the amount of pressure applied by horn 18 onto parts in which it is in forced contact with may be controlled and varied (i.e., increased or decreased) in response to the processor controlling motor 12 appropriately. For instance, upon horn 18 being brought into forced contact with parts, the processor may continue driving motor 12 to move the horn into further contact with the parts which effectively increases the pressure applied by the horn onto the parts.

Figure 4A:
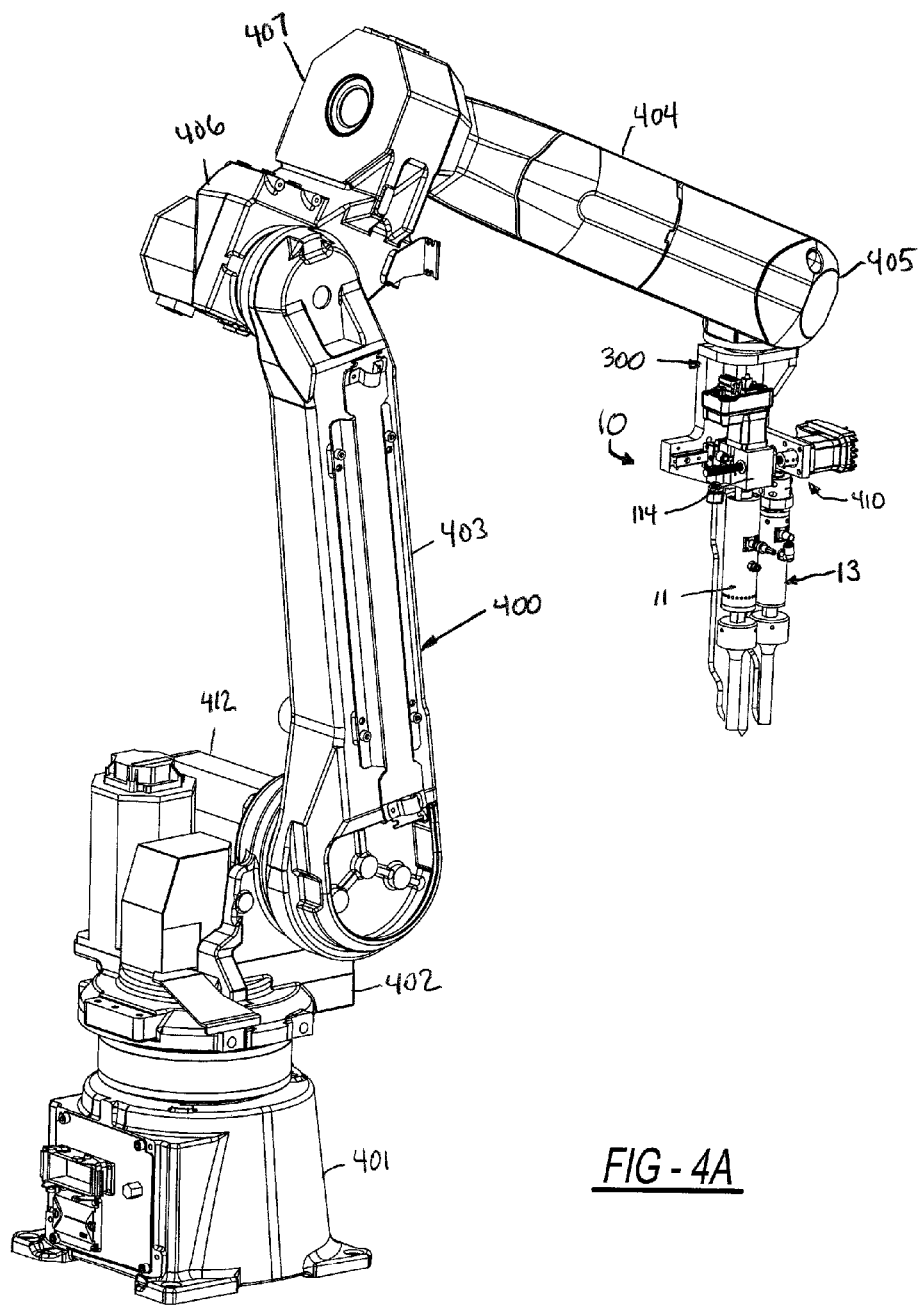
FIG. 4A illustrates a perspective view of the dual ultrasonic welder of FIG. 1 mounted to a robot and positioned remote of an intended work piece.
Figure 4B:
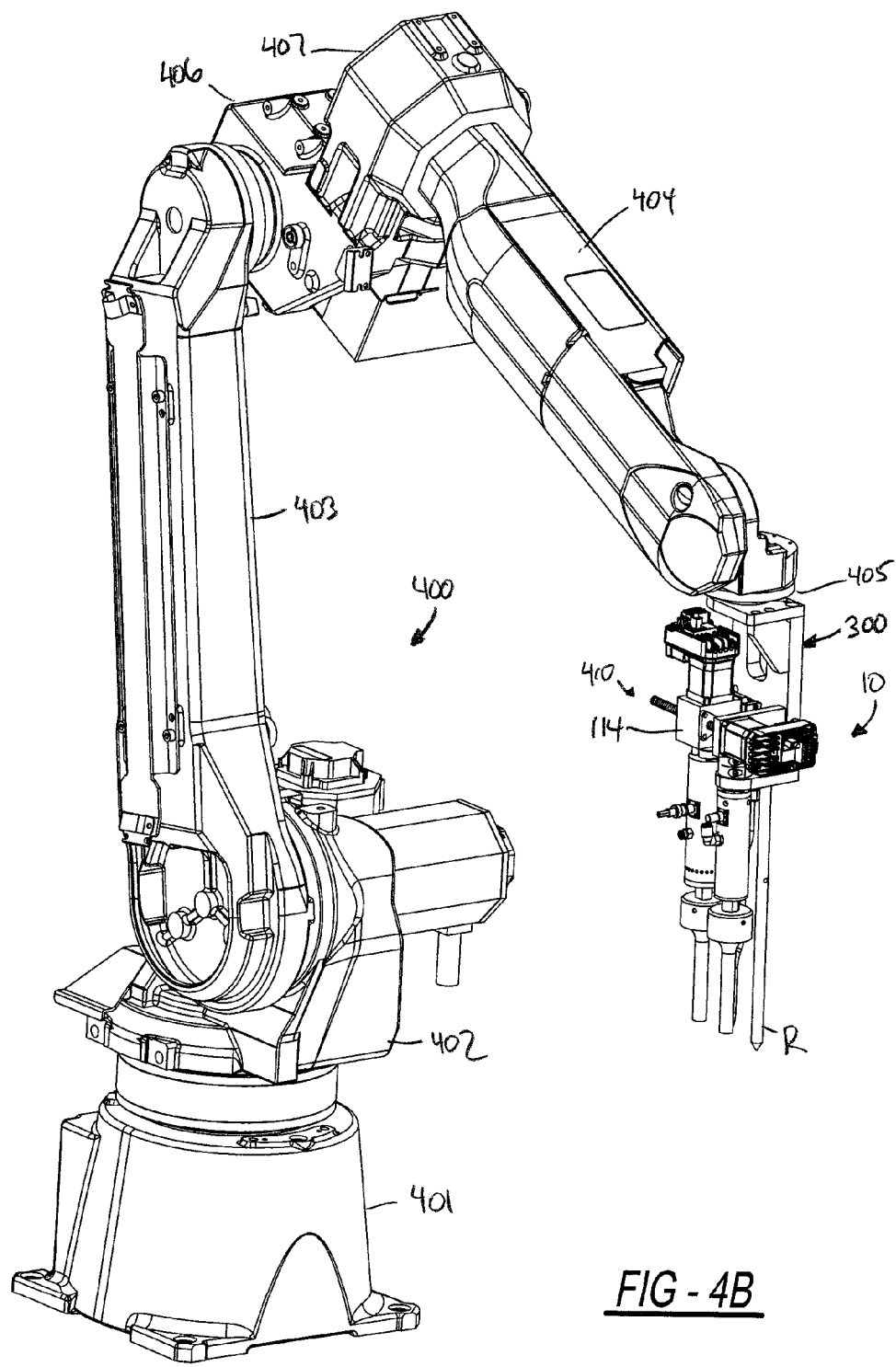
FIG. 4B illustrates a perspective view of the robot and dual ultrasonic welder of FIG. 4A with the welder rotated ninety degrees (90°) about the Z-axis.

With particular reference now to FIGS. 4A and 4B, there is illustrated a robot 400 for use in positioning the welder unit 10 at various locations around a workpiece W held in a fixture. The robot 400 may include a base 401 supporting a base rotor unit 402 and coupled to a first end of an arm 403. The arm 403 extends to a second and four coupling with respect to a forearm 404 having a distal or effector end 405 for coupling to a mounting bracket 300 of the dual sonic welder unit 10. The arm 403 and forearm 404 may be coupled by an elbow 406 and a wrist rotor 407 for adjusting the angle and position of the dual sonic welder unit 10. The robot 400 may further include a motor 412 supported on the rotor base 402 and may be coupled to the first end of the arm 403 for rotationally adjusting the arm 403 with respect to the base 401. It should be noted that while a particular construction of a robot 400 is shown, it may include any and all known or robotic components appropriate for positioning and operating the dual sonic welder unit 10.

Figure 5A:
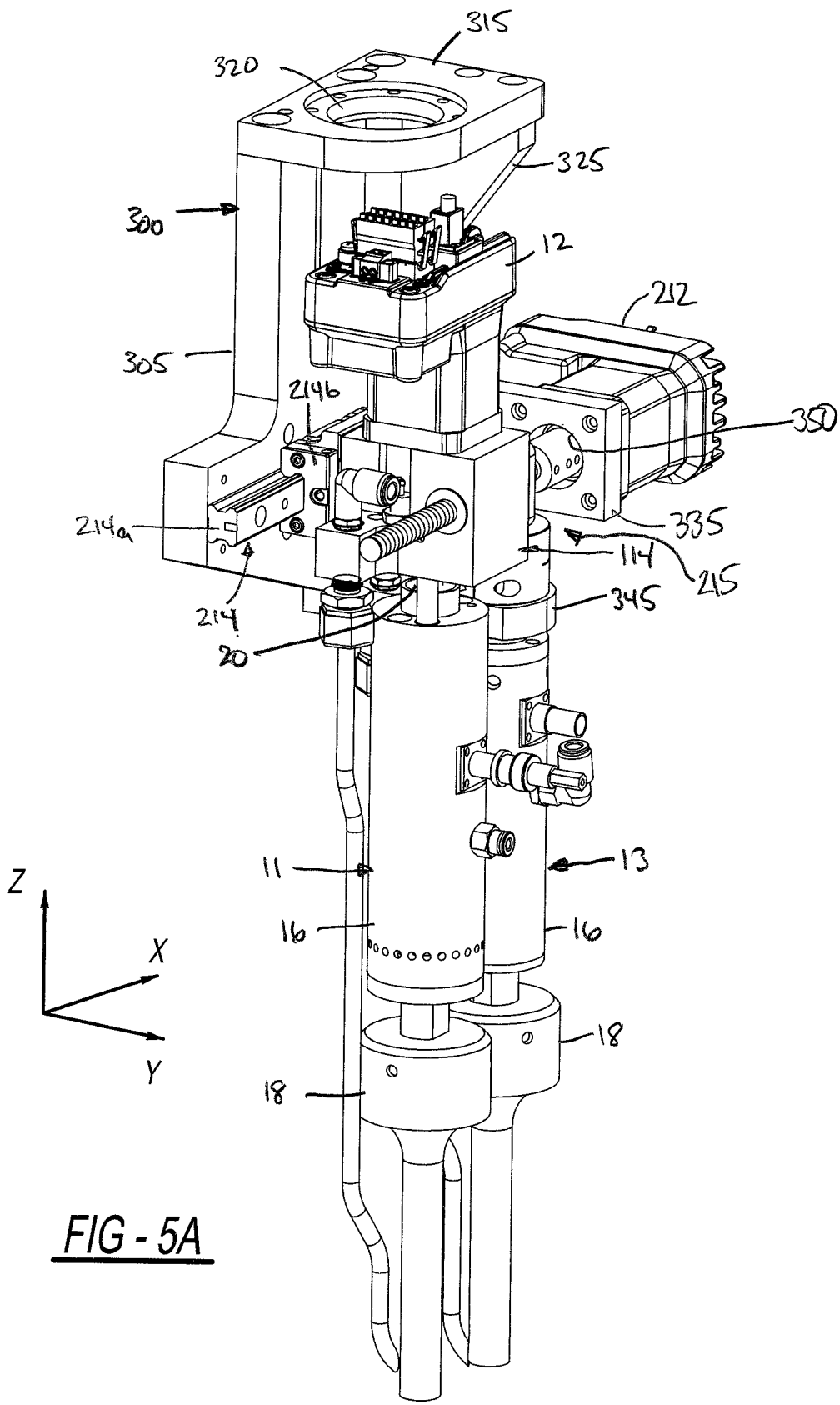
FIG. 5A illustrates a perspective view of the dual ultrasonic welder of FIG. 1.
Figure 5B:
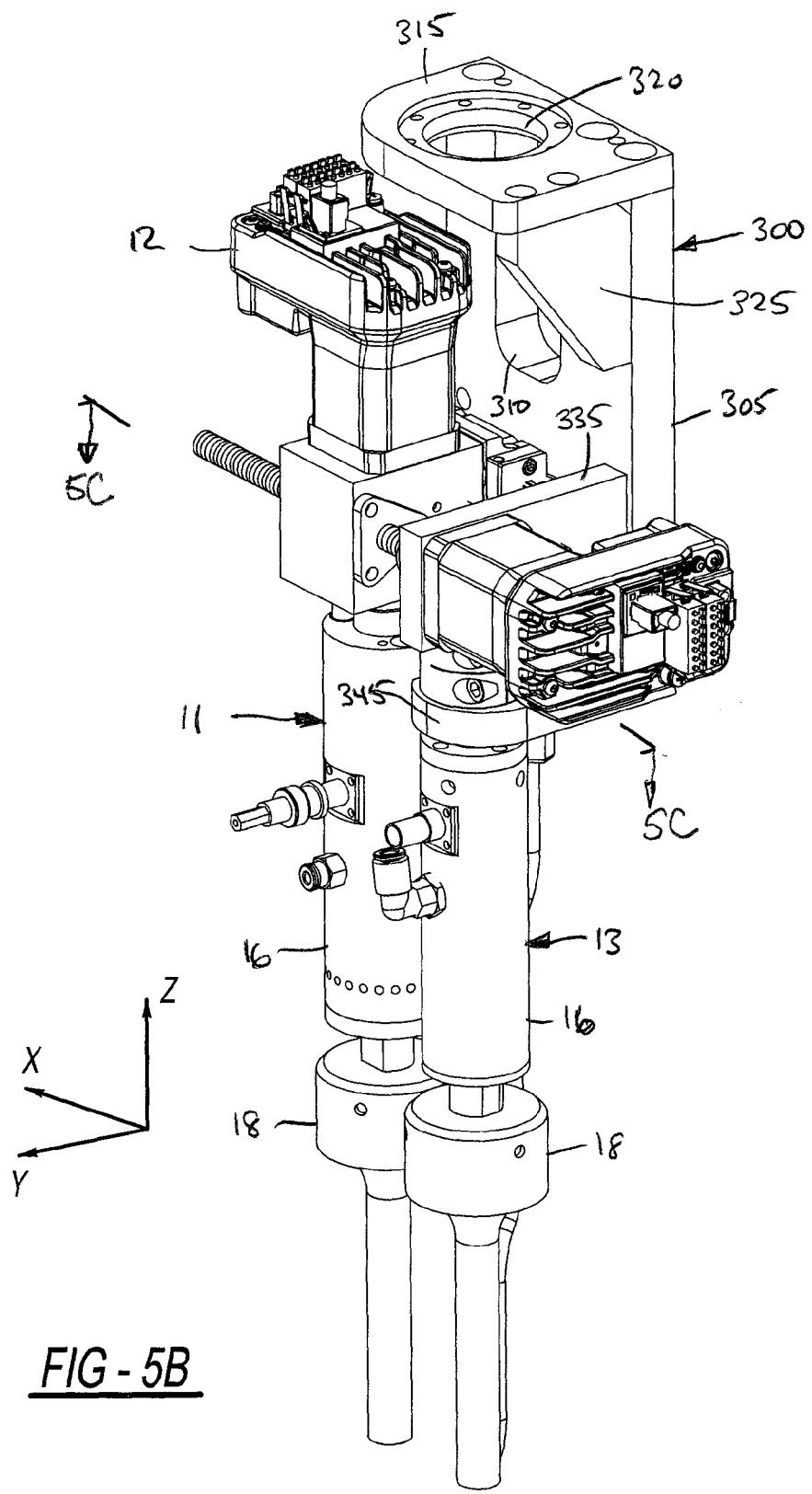
FIG. 5B illustrates a perspective view of the dual ultrasonic welder of FIG. 5A with the welder rotated ninety degrees (90°) about the Z-axis.
Figure 5C:
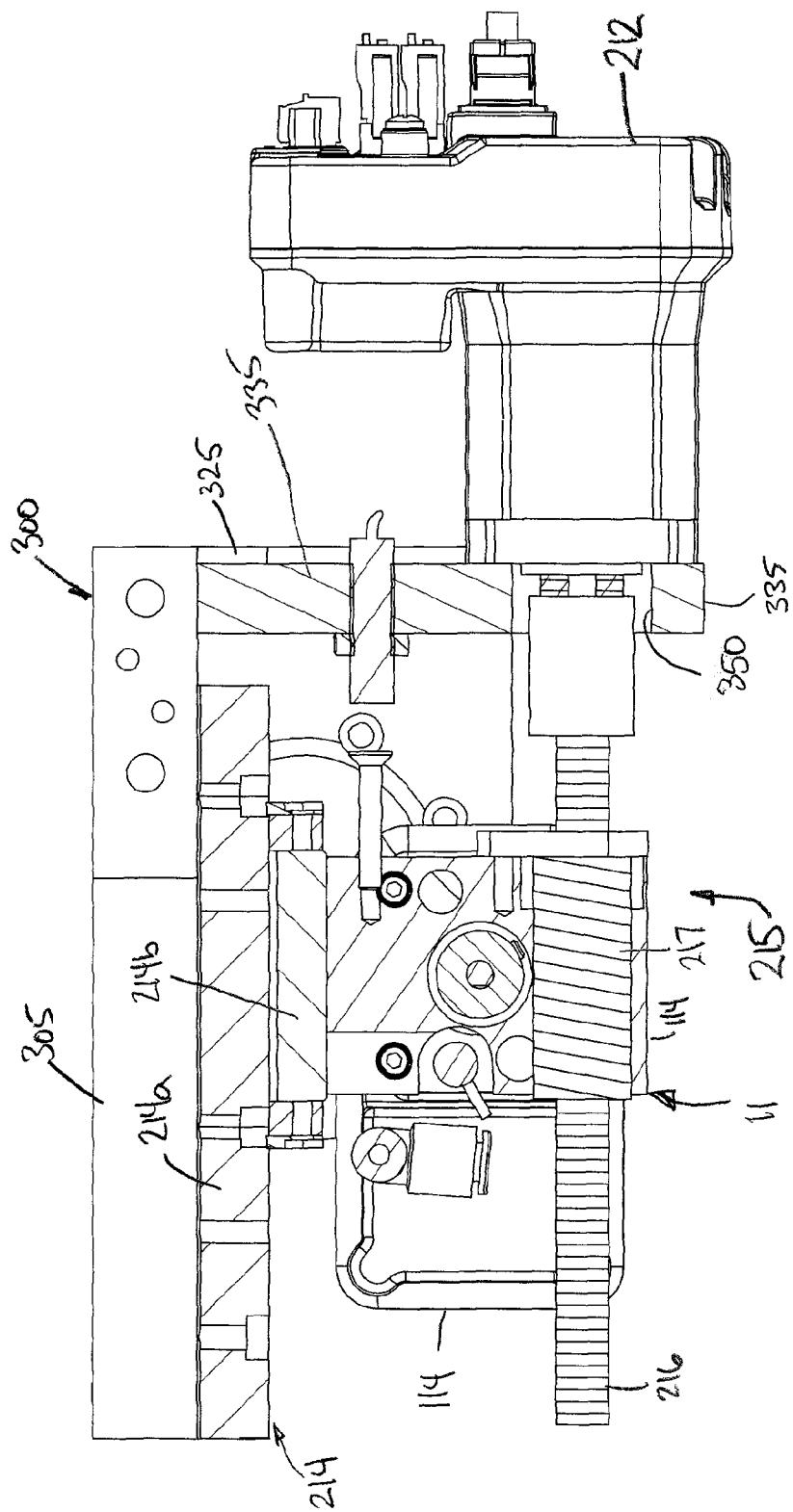
FIG. 5C illustrates a cross-section view of the dual ultrasonic welder of FIG. 5B taken along the section line 5C.

Referring now with particular reference to FIGS. 5A through 5C, the dual sonic welder unit 10 may include the mounting bracket 300 for coupling the dual sonic wall unit 10 to the end 405 of the forearm 404. The mounting bracket 300 may include a first or base portion member 305 generally extending in the XZ plane for carrying first and second welders 11 and 13, respectively. The first portion 305 of the mounting bracket 300 may include a hole or passage 310 that may be used for routing the various power and communication lines from the robot 400 to the welder unit 10, as well as for reducing the mass of the mounting bracket 300. The mounting bracket 300 may further include a second portion or top member 315 coupled to an upper end of the first portion 305 and aligned generally perpendicular to the first member 305 (i.e., aligned in the XY plane). The top member 315 may include a hole or passage 320 that may also be used for routing various power in communication lines from the robot 400 to the welder unit 10. The welding bracket 300 may further include a support member 325 coupled to the first portion 305 and the top portion 315.

The welding bracket 300 may include additional structures or portions for supporting and/or coupling the first and second welders 11 and 13. In particular, the first welder 11 may be adjustably supported and coupled to the base portion 305 and the second welder 13 may be fixedly coupled to the mounting bracket 300 a second mounting extension member 345. The extension member 345 may have a first end fixedly coupled to a lower portion of the base portion 305 and the plane of the extension member 345 may extend generally perpendicular to the base portion 305 in the XY plane such that the plane of the extension member 345 may be aligned parallel to the plane of the top member 315. The second extension member 345 may include a hole or passage for receiving and coupling with the second welder 13 proximal a top end of the second welder 13.

With particular reference to FIGS. 5B and 5C, the mounting bracket 300 may further include a third portion or extension member 335 having a first end coupled to the first portion 305 and extending substantially perpendicular to the first portion 305 such that the third portion 335 is aligned generally in the YZ plane. The third extension member 335 may be positioned and aligned with the adjustable bracket assembly 214 coupled to the base member 305 and therefore the mounting member 114 of the first welder 11. The third extension member 335 may include a hole or passage 350 having a center axis aligned parallel with the X axis direction and substantially parallel and aligned with the longitudinal axis of the slide mounting bracket assembly 214.

In one embodiment of the present disclosure, it will be appreciated that the robot 400 may be coupled to the welder unit 10 such that the end 405 (including any and all other robotic structures) of the forearm 404, when coupled to the top portion 315 (which extends in the XY plane) of the mounting bracket 300, may be moved in the z-axis direction toward the workpiece W by the actuation of the motor 412 on the base rotor 402 of the robot 400. Further, the direction of the force generated by the motor 412 at the end 405 of the forearm 404 may be generally aligned in the z-axis direction and with the particular spot X on the workpiece W. Since the robot 400 may adjust the welder unit 10 in the Z-axis direction, the second sonic welder 13 need not include a motor 12 or its own mounting bar assembly adjuster making its fixed coupling to the extension portion 345 of the mounting bracket 300 quite convenient.

The first sonic welder 11 may be adjustably coupled to the mounting bracket 300 (and with respect to the second sonic welder 13) using the mounting bar assembly 114 of the sonic welder 11 supported on an adjustable slide mounting bracket assembly 214 as best shown in FIG. 5A. The mounting bracket assembly 214 may have a first slide or portion 214a fixed or coupled to the base portion 305 of the mounting bracket 300 proximal a lower end of thereof and aligned with respect to the extension member 345. The mounting bracket assembly 214 may further include a second slide or portion 214b fixed or coupled to the side of the mounting bar assembly 114 facing the base member 305 of the mounting bracket 300. The first and second slides 214a and 214b may be coupled or fixed using any known or appropriate fasteners or other coupling devices or assembly techniques. In one embodiment, the second slide 214b of the mounting bracket assembly 214 facing the mounting bar assembly 114 may have a longitudinally extending shaped passage or keyway for receiving a complimentary shaped portion of the linear slide guide 214a mounted to the base 305. The mounting bracket assembly 214 may have any known or appropriate slide mechanism for providing support and relative movement of the first and second slide portions 214a and 214b and thereby supporting and moving the first welder 11 in the X axis direction with respect to the base 305 and with respect to the second welder 13. In one particular embodiment, the mounting bracket assembly 214 may use a ball bearing design mounting bracket assembly 214. It will be understood that alternative designs and arrangements of the support and mounting bracket assembly device 214 are possible.

In one embodiment of the present disclosure, the welder unit 10 may further include a motor 212 mounted to the extension bracket 335 of the mounting bracket 300 and having a rotary output located proximal the hole 350. The welder unit 10 may include a ball screw assembly 215 including a ball screw 216 mounted to and passing through the mounting bar assembly 114 as best shown in FIG. 5C., the ball screw to 16 may have a first end coupled to the output of the motor 212 and a second or distal end extending from the mounting bar assembly 114. The ball screw assembly 215 may include a ball screw nut 217 that may be fixed to or within the mounting bar assembly 114. When activated, the output of the motor 212 rotates the ball screw 216 in one direction thereby moving the welding gun 11 in one direction along the X-axis. The output of the motor 212, may be rotated in the opposite direction to rotate the ball screw to 16 and an opposite direction thereby moving the welding gun in an opposite direction along the X-axis.

With particular reference now to FIGS. 6A through 6F, there is illustrated several process steps of operation of the welder unit 10 to make ultrasonic welds X on the workpiece W. The workpiece W may be of any known type or construction which may be commonly ultrasonically welded. The workpiece W may be a single or multiple part assembly or may be any known device to be attached to the workpiece W (e.g., a bracket to be ultrasonically welded to a door panel for use in an automobile door). It may be understood that the workpiece W will be located and secured within a fixture used by the robot 400 and the welder unit 10 may include a master locator pointer rod R (see FIG. 4B) for determining and/or resetting the known position of the robot and the welder unit 10 relative a master origin on the fixture so the robot 400 and the welding unit 10 may be accurately moved to various welding locations on the workpiece W.

Figures 6A, 6B:
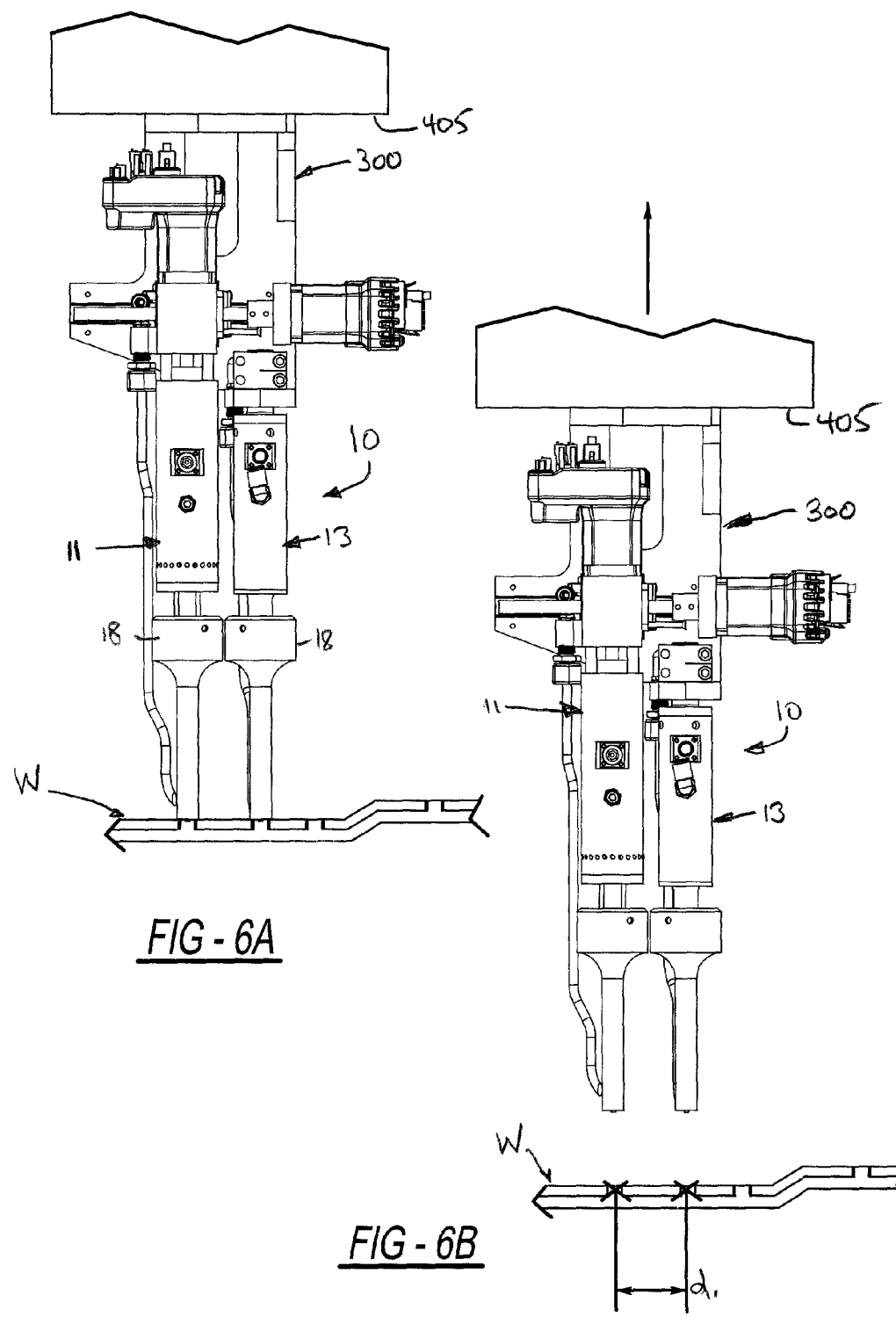
FIG. 6A illustrates a plan view of the dual ultrasonic welder of FIG. 1 with the welder in position to perform a sonic weld on a workpiece.
FIG. 6B illustrates a plan view of the dual ultrasonic welder of FIG. 6A with the welder removed from the workpiece by the robot arm and showing the sonic weld on the workpiece.

The robot 400 may be operated to move the welding unit 10 so that the ultrasonic horns 18 are located on the workpiece W at the locations to be ultrasonically welded which positions may be stated in relative X, Y and Z. coordinates or may also be calculated to be a specific distance along a radian line that intersects the centerlines or points of each of the spaced apart weld locations $L_n$ on the workpiece W. With particular reference to FIG. 6A, the end 405 of the robot 400 and the welder unit 10 may be located at first location $L_1$ including first and second spot welds located a distance $d_1$ apart such that welder 11 is aligned with the first weld spot and welder 13 is aligned with the second weld spot. As noted above, the welder unit 10 simultaneously activates the first and second ultrasonic welder's to cause the ultrasonic horns 18 to simultaneously (but alternatively sequentially) ultrasonically weld each spot X while the motor 412 of the robot 400 is operated to control the welder unit 10 in the negative Z direction toward the workpiece W, as shown in FIG. 6A. Once the spot welds X at the first location $L_1$ on the workpiece W are complete, the motor for 412 of the robot 400, may be reversed to move the welder unit 10 away from the workpiece W as shown in FIG. 6B.

Figures 6C, 6D:
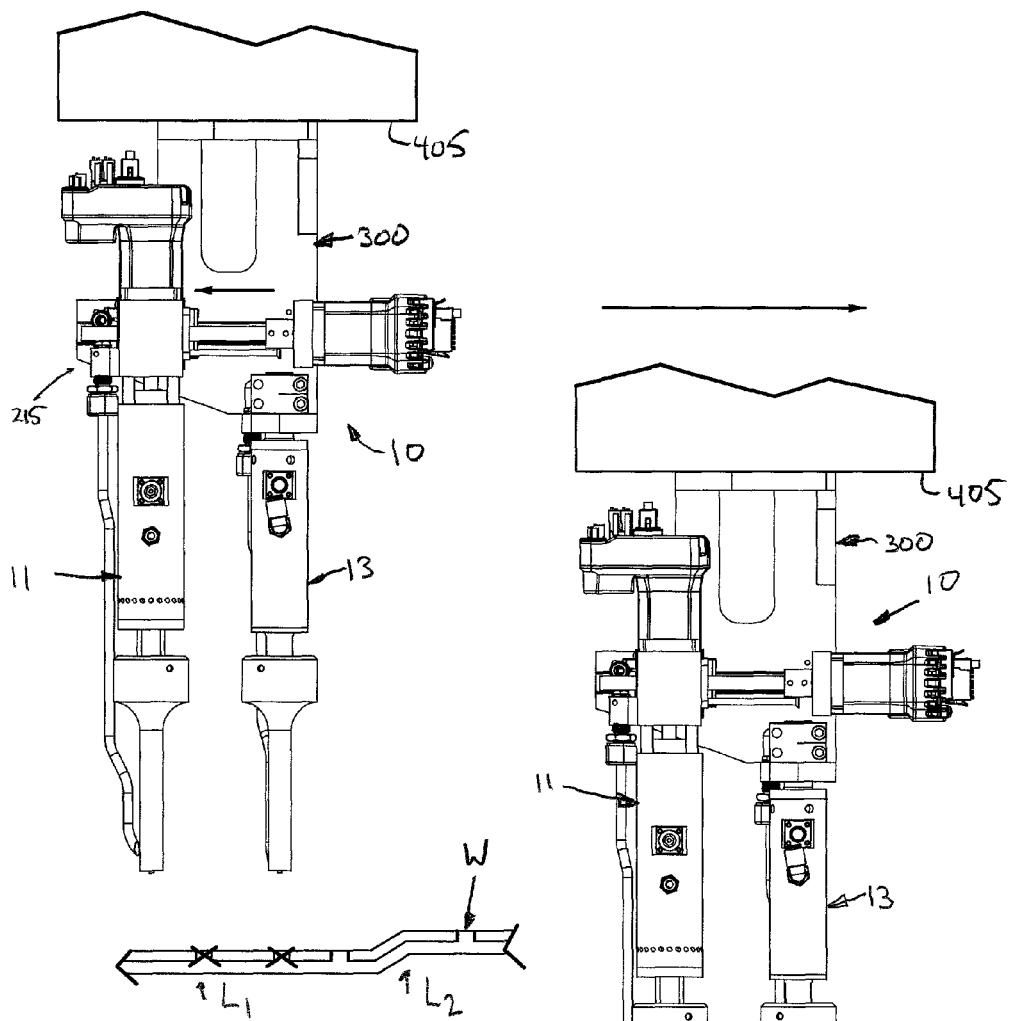
FIG. 6C illustrates a plan view of the dual ultrasonic welder of FIG. 6B wherein the distance between the first and second welders is being adjusted.
FIG. 6D illustrates a plan view of the dual ultrasonic welder of FIG. 6C wherein the robot arm moves the dual ultrasonic welding unit from a first set of spot welds to a second set of spot welds.
Figure 6E:
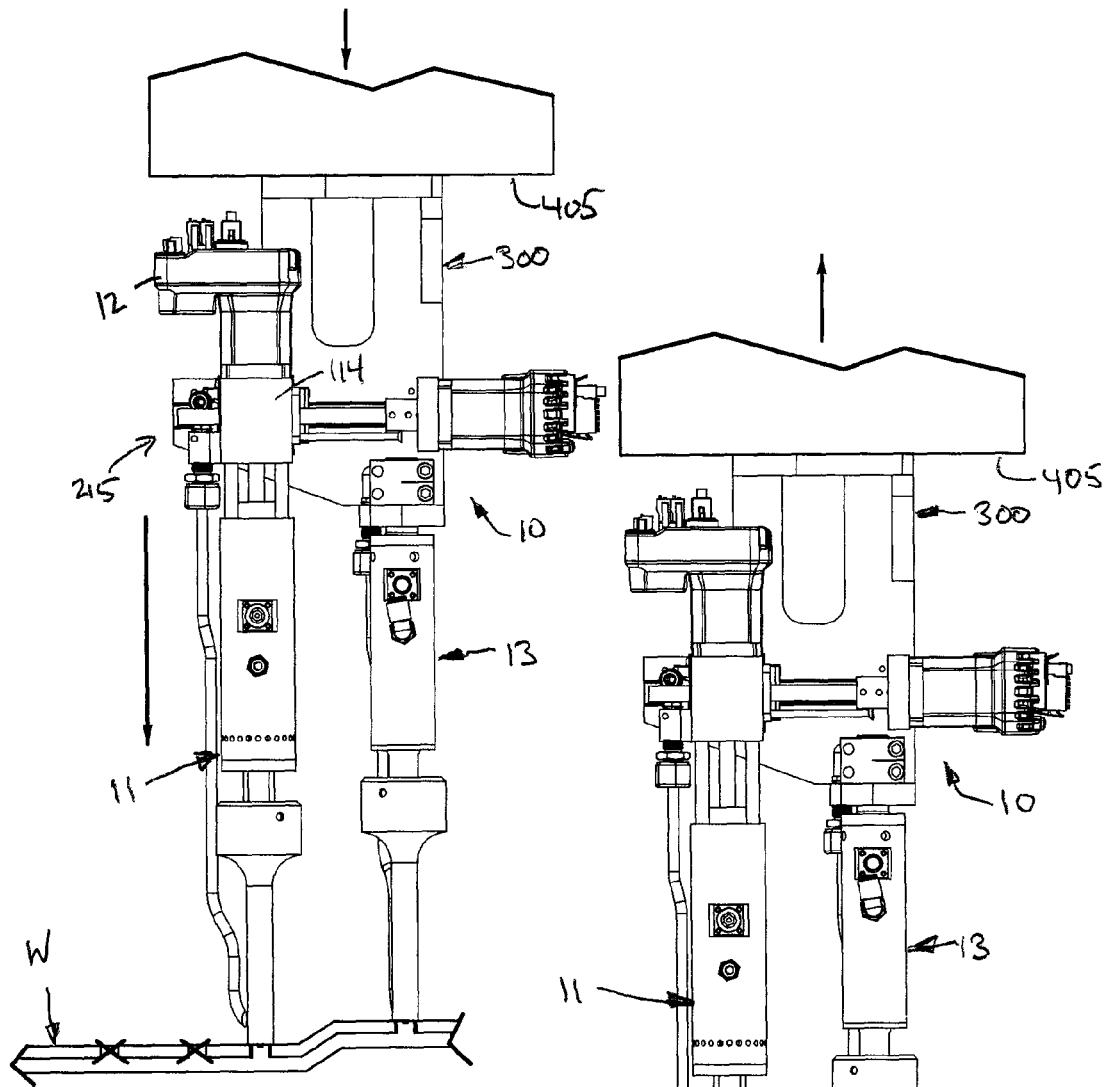
FIG. 6E illustrates a plan view of the dual ultrasonic welder of FIG. 6D wherein the one ultrasonic welder is moved in the z-direction and the robot arm moves the dual ultrasonic welding unit toward the second set of spot welds.
Figure 6F:
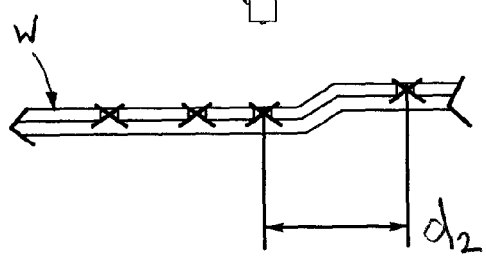
FIG. 6F illustrates a plan view of the dual ultrasonic welder of FIG. 6E wherein the robot arm moves the dual ultrasonic welding unit away from the second set of spot welds formed on the workpiece.

The robot 400 and the welder unit 10 may next be adjusted for simultaneously performing ultrasonic spot welds at a second location $L_2$ where the first and second spot welds are located a distance $d_2$ apart. Accordingly, the distance between the first welder 11 and the second welder 13 may be adjusted by the ball screw assembly 215 as shown in FIG. 6C. Further, the end 405 of the robot 400 may be moved to the second location $L_2$ as shown in FIG. 6D. The adjustment of the distance between the first welder 11 and the second welder 13 and the movement of the end 405 of the robot 400 may occur simultaneously, or in any sequenced order. Additionally, the weld spots X at the location $L_2$ may differ in the Z direction. In this instance, the motor 12 of the welder 11 may be activated to adjust the location of the ultrasonic horn 18 of the welder 11 as shown in FIG. 6E. Once the ultrasonic horns 18 of the first welder 11 and the second welder 13 are properly located on the weld spots after the movement of the end 405 of the robot 400, the first and second welder's 11 and 13, may be operated to again form the ultrasonic spot welds X on the workpiece W as shown in FIG. 6F. Again the end 405 of the robot 400 may be moved in the Z direction to move the welding unit 10 away from the workpiece W. The Z-axis adjustment of the welder 11, to adjust the ends of the welders 11 and 13 to match the difference in the Z-axis location of the spot welds at the next location $L_2$ may occur simultaneously or sequentially with the movement of the end 405 of the robot 400 and may occur simultaneously or sequentially with the activation of the ball screw assembly 215.

The various process steps for the method of operation of the dual ultrasonic welder unit 10 reflected in FIGS. 6A through 6F may be repeated in any order or sequence as the welder unit 10 is moved to all of the locations $L_n$ around the workpiece W. In this regard, the details of the distances $d_n$ (in the X, Y and Z directions) between the two weld spots at the various locations $L_n$ may be optimized to reduce the amount of Z-axis movement of the first welder 11, as well as to reduce the amount of X-axis adjustment between the first welder 11 and the second welder 13 by the ball screw assembly 215. In one embodiment of the present disclosure, the process steps may be optimized to minimize the amount of Z-axis movement of the first welder 11.

The welder unit 10 of the present disclosure may have particular advantages in reducing the overall cycle time to process the workpiece W. Further, it the welder unit 10 of the present disclosure provides the opportunity to optimize the distances $d_n$ (in the X, Y and Z directions) between the two weld spots X at the different locations $L_n$ on the workpiece W. In one embodiment of the present disclosure, the path of the end 405 of the robot and the welder unit 10 may be optimized to first position the welder unit 10 at locations $L_n$ having the minimal amount of differences in the distances $d_n$ on the workpiece W. Accordingly, the process starts by first dual ultrasonic welding the location $L_n$ having the smallest distances $d_n$ between the weld spots and then progressing to dual ultrasonically weld the next location $L_n$ having the smallest distances $d_1$ and then moving next to the location s $L_n$ with greater and more variable distances $d_n$. Alternatively, the dual ultrasonic welding process may start with dual ultrasonic welding at the location $L_n$ having the largest distances $d_n$ and then progressing to the next location $L_n$ having next largest distances $d_n$ and then continuing to progress to the locations having smaller and less variable distances $d_n$ between the weld spots at the location $L_n$.

While embodiments of the present disclosure are illustrated and described, it is not intended that these embodiments illustrate and describe every conceivable form of the present disclosure. For example, while the present disclosure relates particularly to a dual ultrasonic welder unit 10, it will be appreciated that the disclosure and teachings thereof may be applied to other applications and devices for performing work on a workpiece W putting, but not limited to any and all manufacturing, forming, aggregating and/or removing operations. The words used in the specification are words of open description and not words of limitation, and it is understood that various changes may be made without departing from the spirit and scope of the following claims.

We claim:

1. A dual ultrasonic welder unit for coupling to an end of a robot, the dual ultrasonic welder unit comprising:
  a. a mounting bracket comprising:
    i. a first base member aligned in a first plane;
    ii. a second top member aligned in a second plane, the second top member orthogonal to the first base member, the second top member adapted to be coupled to the end of the robot;
    iii. a first extension member aligned in a third plane, the first extension member orthogonal to the first base member and aligned orthogonally with respect to the second top member, the first extension member including a first passage;
    iv. a second extension member aligned in a plane parallel to the second top member, the second extension member orthogonal to the first base member, the second extension member adapted for having a second ultrasonic welder fixedly coupled thereto;
  b. a mounting bar assembly for adjustably supporting a first ultrasonic welder to the base member, the mounting bar assembly having a first portion coupled to the first base member of the mounting bracket and a second portion for mounting to the first ultrasonic welder;
  c. an adjuster coupled to the first extension member of the first base member for supporting and moving the first ultrasonic welder with respect to the first base member to adjust the distance between the first and second ultrasonic welders in a longitudinal direction parallel to the first and second planes.

2. The dual ultrasonic welder unit of claim 1 further comprising the first ultrasonic welder coupled to the second portion of the mounting bar assembly and the second ultrasonic welder fixedly coupled to the second extension member and wherein the first and second welders are aligned parallel to each other to perform an ultrasonic welding operation on a workpiece in a direction aligned substantially perpendicular to the second plane.

3. The dual ultrasonic welder unit of claim 1 wherein the adjuster comprises a motor coupled to the first extension member and a rotary, threaded shaft having one end coupled to motor, the rotary, threaded shaft coupled to the first ultrasonic welder such that rotation of the motor adjusts the position of the first ultrasonic welder.

4. The dual ultrasonic welder unit of claim 1 wherein the first and second ultrasonic welders are adapted to perform the ultrasonic welder operation on the workpiece by operation of the end of the robot in a direction aligned substantially perpendicular to the second plane.

5. A dual ultrasonic welder unit for coupling to a robot, comprising:
  a. a mounting bracket coupled to an end of an arm of a robot, the mounting bracket including first base member aligned in a first plane, a second top member aligned in a second plane orthogonal to the first plane and being adapted to be coupled to the end of the robot, a first extension member aligned in a third plane orthogonal to the first plane and orthogonal to the second plane, the first extension member including a first passage, and a second extension member aligned in a fourth plane parallel to the second plane and orthogonal to the first plane, the second extension member adapted for having a second ultrasonic welder fixedly coupled thereto;
  b. a mounting bar assembly including a first portion coupled to the mounting bracket and a second portion for coupling to a first ultrasonic welder;
  c. a first ultrasonic welder coupled to the second portion of the mounting bar assembly and adapted to be independently of the robot adjustable in at least two directions with respect to the mounting bracket;
  d. a second ultrasonic welding gun fixedly coupled to the mounting bracket and positioned relative to the first ultrasonic welder;
  e. an adjuster having a first portion coupled to the first ultrasonic welding gun and a second portion coupled to the second ultrasonic welding gun, the adjuster for adjusting the distance between the first and second ultrasonic welding guns in at least one direction.

6. A welder comprising:
  a. a mounting bar assembly adapted to be mounted to an end of an arm of a robot, the mounting bar assembly attached with respect to an end of an arm of the robot along one side of the mounting bar assembly, the mounting bar assembly further having an attachment bar mounted to another side of the mounting bar assembly, the attachment bar having a slide guide rail mounted to the attachment bar for its longitudinal extent;
  b. an extended mounting bracket having a complementary key way groove slidably attached to the slide guide rail of the attachment bar enabling sliding movement of the extended mounting bracket along the slide guide rail of the attachment bar;
  c. a top end bracket having a bottom surface and an extended portion securely fixed to the mounting bar assembly for movement therewith;
  d. a first ultrasonic welder having an ultrasonic transducer housing mounted to the bottom surface of the top end bracket whereby the first ultrasonic welder is limited to the same directional movement as the end of the arm of the robot;
  e. a second ultrasonic welding gun having an ultrasonic transducer housing, the second ultrasonic welding gun fixedly coupled to the extended mounting bracket;
  f. a ball screw assembly mounted to the mounting bar assembly, the ball screw assembly having a ball screw threaded shaft extending in a direction toward the extended mounting bracket, the extended mounting bracket having a ball nut integral therewith for receiving the ball screw threaded shaft whereby when the ball screw assembly is activated to rotate the ball screw threaded shaft within the ball nut, the second ultrasonic welding gun attached to the extended mounting bracket is moved in a direction with respect to the first ultrasonic welder which is substantially orthogonal with respect to a direction of ultrasonic welding.

* * * * *

UNITED STATES PATENT AND TRADEMARK OFFICE
CERTIFICATE OF CORRECTION

PATENT NO. : 9,808,883 B2
APPLICATION NO. : 14/961847
DATED : November 7, 2017
INVENTOR(S) : Matthew E. Ballough et al.

Page 1 of 1

It is certified that error appears in the above-identified patent and that said Letters Patent is hereby corrected as shown below:

In the Claims

In Claim 4, Column 15, Line 1; after "welder operation on" replace "the workpiece" with --a workpiece--

In Claim 5, Column 15, Line 30; before "and a second portion" replace "ultrasonic welding gun" with --ultrasonic welder--

In Claim 5, Column 15, Line 32; after "between the first" replace "and second" with --ultrasonic welder and the second--

In Claim 5, Column 15, Line 33; before "in at least one" replace "ultrasonic welding guns" with --ultrasonic welding gun--

Signed and Sealed this
Twentieth Day of November, 2018

Andrei Iancu
*Director of the United States Patent and Trademark Office*